United States Patent [19]

LaTorre et al.

[11] Patent Number: 5,249,871
[45] Date of Patent: Oct. 5, 1993

[54] HIGH FORCE BALL BEARINGS

[75] Inventors: Richard R. LaTorre, Punta Gorda, Fla.; George C. Cusiter, late of Camarillo, Calif., by Nancy Cusiter, executrix

[73] Assignee: Raytheon Company, Lexington, Mass.

[21] Appl. No.: 5,918

[22] Filed: Jan. 15, 1993

Related U.S. Application Data

[63] Continuation of Ser. No. 599,932, Oct. 19, 1990, abandoned.

[51] Int. Cl.⁵ .................................................. F16C 19/52
[52] U.S. Cl. ...................................... 384/551; 244/3.16
[58] Field of Search ............... 384/551, 613, 517, 518, 384/537; 244/3.16

[56] References Cited

U.S. PATENT DOCUMENTS

| | | |
|---|---|---|
| 3,738,719 | 6/1973 | Langner . |
| 3,900,232 | 8/1975 | Rode . |
| 4,116,506 | 9/1978 | Moritomo et al. . |
| 4,155,521 | 5/1979 | Evans et al. .................. 244/3.16 |
| 4,172,621 | 10/1979 | Yoshida . |
| 4,325,590 | 4/1982 | Pethis . |
| 4,523,864 | 6/1985 | Walter et al. ................. 384/613 |
| 4,676,667 | 6/1987 | Komatsu et al. .............. 384/517 |
| 4,892,423 | 1/1990 | Takahashi et al. ............ 384/613 |
| 4,958,941 | 9/1990 | Imanari ........................ 384/551 |

Primary Examiner—Lenard A. Footland
Attorney, Agent, or Firm—Donald F. Mofford; Richard M. Sharkansky

[57] ABSTRACT

A ball bearing assembly with a spacer to prevent ball bearing failures. The spacer has a ring with a tongue that fits into a groove in a second spacer ring. One spacer ring is coupled to the outer ring of the ball bearing assembly and the other spacer ring is coupled to the inner ring of the ball bearing assembly. The spacer therefore allows relative rotation of the rings of the ball bearing assembly but prevents relative translation of the rings beyond a point which will damage the ball bearing assembly.

18 Claims, 2 Drawing Sheets

HIGH FORCE BALL BEARINGS

The Government has rights in this invention pursuant to Contract No. DAAK10-80-C-0066 awarded by the Department of the Army.

This application is a continuation of application Ser. No. 07/599,932, filed Oct. 19, 1990.

BACKGROUND OF THE INVENTION

This invention relates generally to bearing systems and more particularly to ball bearing systems.

Ball bearings are widely used where one part must rotate relative to another part. Ball bearing assemblies are commercially available.

These assemblies contain an outer ring and an inner ring. The inside of the outer ring and the outside of the inner ring are grooved. The grooves are aligned to form a raceway to contain metal balls. The two rings "roll" on the balls and are free to rotate relative to each other. In use, the inner ring is often mounted to a shaft. The outer ring is mounted to some base. The shaft is thus free to rotate relative to the base.

Commercially available ball bearing assemblies will withstand a specified range of axial and radial forces on the shaft. If forces in excess of the specified range are applied to the shaft, the bearing assembly may fail. For example, the balls or the races might become permanently deformed such that the balls no longer roll smoothly in the races. Alternatively, the balls or races might fracture.

One method of lessening failures associated with forces along the shaft is to use several bearings. For example, using four ball bearings on a shaft instead of two allows twice as much force to be applied to the shaft before the ball bearings fail.

The ability of the ball bearings to withstand forces without failing can also be increased by increasing the size of the bearings or the number of balls in each ball bearing.

While these known techniques can increase resistance to forces on the shaft, they also add manufacturing complexity, cost, size, and weight. The known techniques for making bearing assemblies which can withstand high forces also have more friction than a simple assembly. Since higher friction requires more power to turn the shaft, the known techniques may not be adequate for some applications. In a class of modern military projectiles, called "smart munitions", these limitations can be very significant. For example, when the projectile is fired, very large forces are applied to the shaft. Thereafter, a seeker head mounted on the shaft must spin very smoothly in order to guide the projectile. Since the projectile explodes at the end of its flight, the cost of the projectile must be minimized. Also, size and weight impact the performance of the projectile.

SUMMARY OF THE INVENTION

With the foregoing background of the invention in mind, it is an object of this invention to provide a ball bearing assembly which can withstand high forces on its shaft.

It is a further object to provide a spacer assembly for use with ball bearings which withstand specified radial and axial forces which allow the ball bearings to operate after higher radial and axial forces have been applied.

The foregoing and other objects are achieved in a ball bearing assembly comprising two conventional ball bearings separated by a spacer assembly. The spacer assembly comprises two rings. One ring is fixedly attached to the inner rings of the ball bearings. The second ring of the spacer assembly is fixedly attached to the outer rings of the ball bearings. The two rings of the spacer interlock with a tongue and groove arrangement. The tongue and groove are fabricated with tight tolerance such that very little motion of the rings of the spacer assembly is possible in either a radial or axial direction and hence limit movement of the inner rings of the bearing assembly relative to the outer rings when large forces are applied. The limited movement of the inner and outer rings ensures the contact stresses between the balls and the races remain below their elastic limit, thereby preventing bearing failure.

BRIEF DESCRIPTION OF THE DRAWINGS

The invention may be better understood by reference to the following more detailed description and accompanying drawings in which.

DESCRIPTION OF THE PREFERRED EMBODIMENTS

Figure 1:
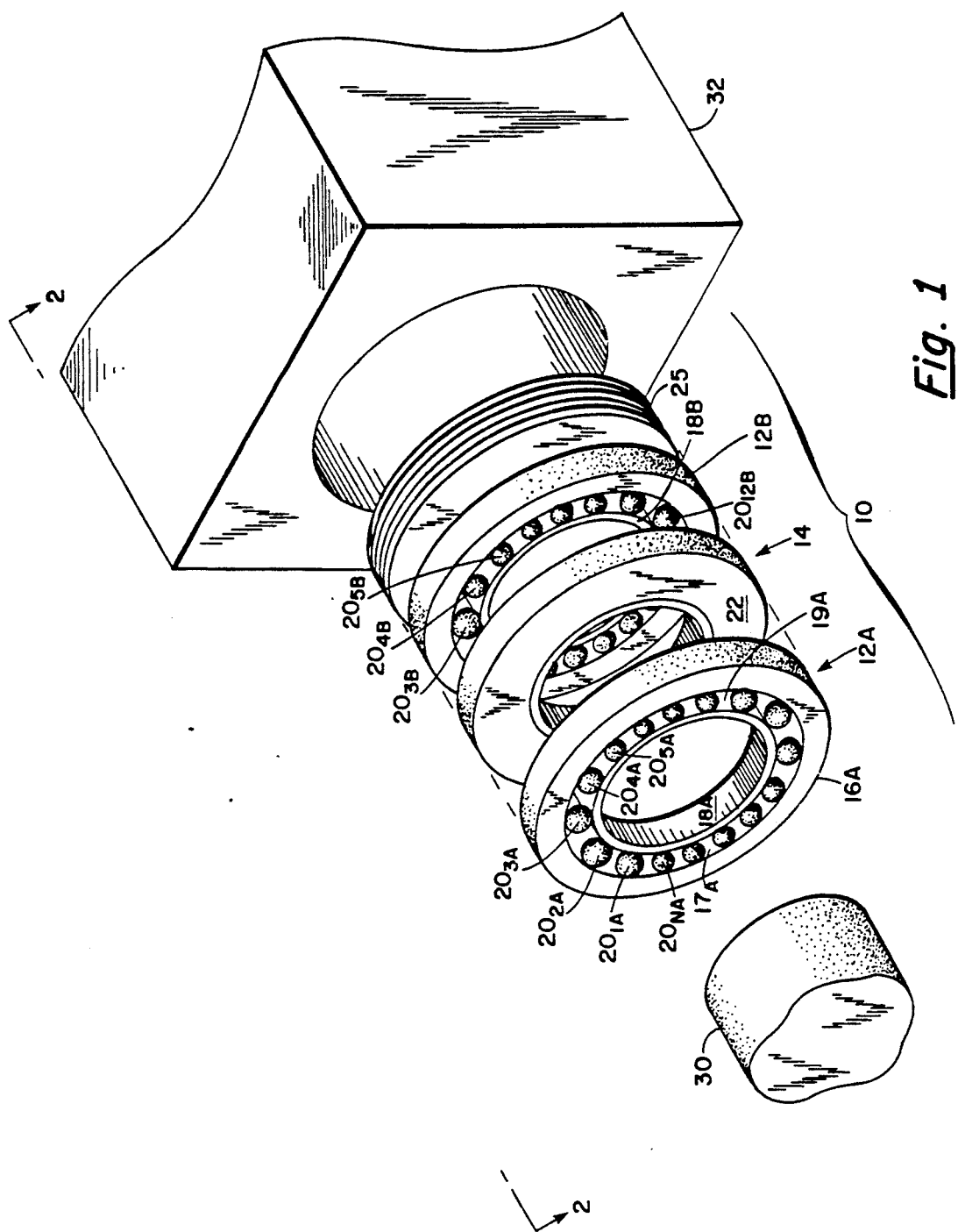
FIG. 1 shows an exploded isometric view of a bearing assembly fabricated according to the invention.

FIG. 1 shows a bearing assembly 10. Bearing assembly 10 comprises ring assemblies 12A and 12B. These ring assemblies are separated by spacer assembly 14. Here, the bearing assembly 10 is a preloaded bearing assembly in the back to back configuration Preloaded bearings are known in the art and used where precision is required. However, preloaded bearings do not have to be used.

Ring assemblies 12A and 12B are conventional ball bearings. Taking ring assembly 12A as representative, the ring assembly comprises an outer ring 16A and an inner ring 18A. Inner ring 18A has a groove 19A. As seen in FIG. 1, inner ring 18A and outer ring 16A are aligned such that grooves 17A and 19A are aligned Grooves 17A and 19A form a raceway which contains balls $20_{1A} \ldots 20_{NA}$.

Balls $20_{1A} \ldots 20_{NA}$ roll in the grooves 17A and 19A, allowing inner ring 18A to rotate relative to outer ring 16A. In use, a shaft 30 is mounted to inner rings 18A and 18B. Outer rings 16A and 16B are mounted in a base 32 allowing the shaft 30 to rotate relative to the base.

Figure 2:
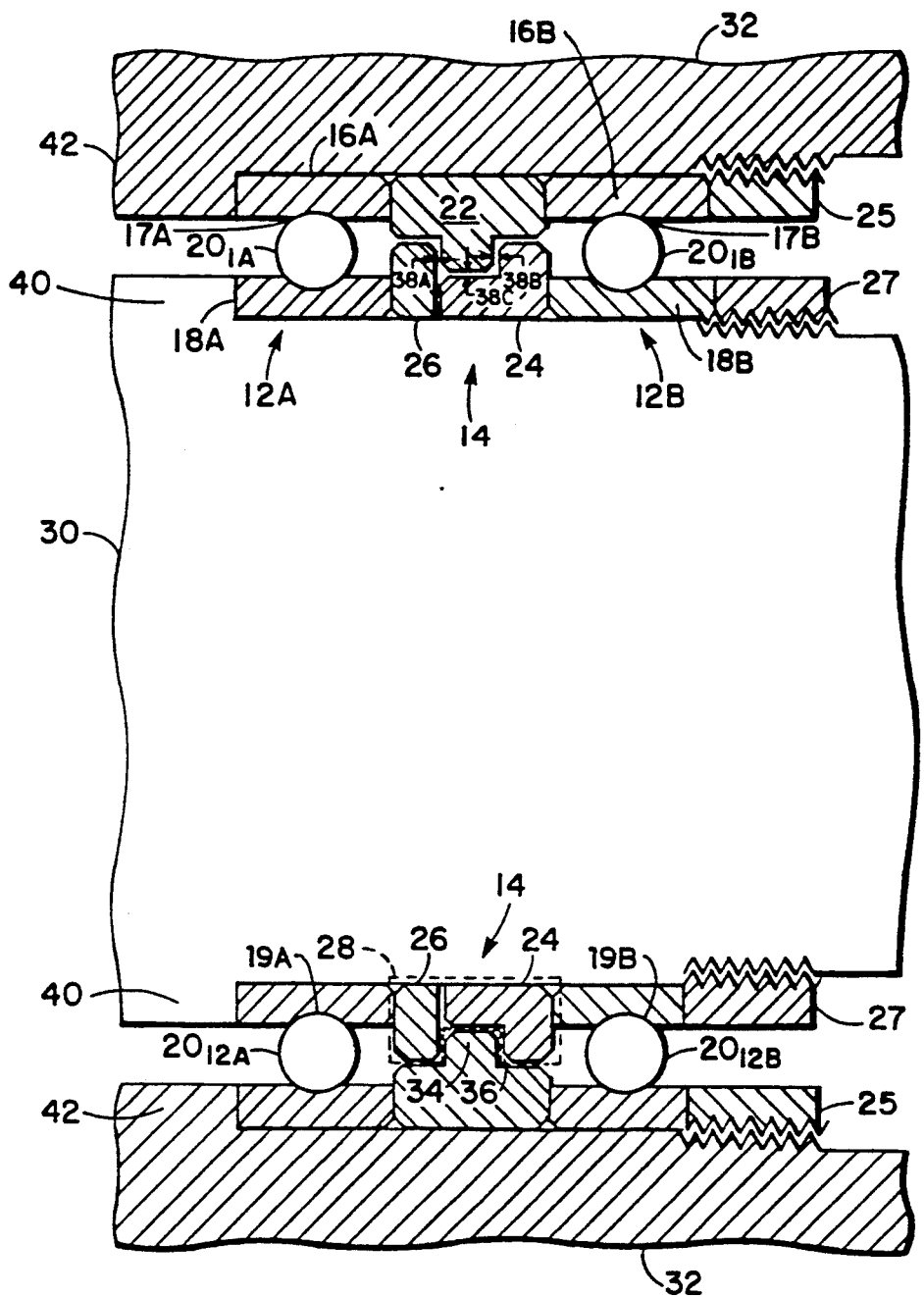
FIG. 2 shows a cross section of the bearing assembly of FIG. 1 taken along the line marked 2—2.

Spacer assembly 14 is constructed from three separate pieces: T-spacer 22, L-spacer 24, and rectangular spacer 26 (FIG. 2). These spacers are made from materials conventionally used to make the ring assemblies and balls in a ball bearing assembly. For example, stainless steel made by the hot isostatic press process known as HIP WD65 (1% C, 14.75% Cr, 4% Mo, 1.2% V) could be used for its hardness, corrosion resistance, ability to withstand large loads, and ability to withstand high temperatures. Other materials, preferably with a hardness in excess of Rockwell C58, could be used instead. These spacers will be better understood by reference to FIG. 2.

FIG. 2 shows the ball bearing assembly 10 in cross section. Here, the inner rings 18A and 18B are shown mounted to a shaft 30. Outer rings 16A and 16B are in contact with a base 32. Here, base 32 is any component with respect to which shaft 30 will rotate.

Spacer assembly 14 is comprised of T-spacer 22 which forms an outer spacer ring (more clearly shown in FIG. 2), L-spacer 24, and rectangular spacer 26 form an inner spacer ring 28 with a groove 36. Here, the inner spacer ring 28 is made up of two pieces to enable assembly while the outer spacer ring is made up of one piece for ease of fabrication. One of skill in the art will appreciate that both the inner and outer spacer rings might be made from any number of separate pieces.

Tongue 34 of T-spacer 22 fits into groove 36 in inner spacer ring 28. Tongue 34 fits into groove 36 with a close clearance. The amount which the inner spacer ring 28 may move axially relative to outer spacer ring 25 is denoted by clearance 38A and 38B. The amount which inner spacer ring 28 may more radially relative to outer spacer ring 25 is denoted by clearance 38C.

The bearing assembly 10 is held together by a combination of locking rings and shoulders. These features can be more clearly seen in FIG. 2. Shaft 30 has a shoulder 40 contacting inner ring 18A and restraining it. Base 32 has a shoulder 42 contacting outer ring 16A and restraining it. Outer locking ring 25 screws into threads on base 32 to secure outer ring 16B. Inner locking ring 27 screws into threads on shaft 30 to secure inner ring 8B. In this way, the individual pieces of bearing assembly 10 are held tightly together.

One of skill in the art will appreciate that, where precision bearings are required, special tools and assembly techniques may be required. Such techniques are known in the art. To assemble bearing assembly 10, ring assembly 12A is installed to bank against shoulders 40 and 42. Next, spacer assembly 14 is installed in the following order: first rectangular spacer ring 26, T-spacer ring 22 and L-spacer 24. Ring assembly 12B is then installed. Outer locking ring 25 is then installed to clamp outer rings 16A, 16B, and outer spacer ring 22 together. Locking ring 27 is then installed. Locking ring 27 is torqued until tongue 34 is centered in groove 36. This configuration provides minimum friction and removes radial and end play in the assembly.

The way in which spacer assembly 14 prevents bearing failures may be understood as follows:

A force on shaft 30 tends to displace inner rings 18A and 18B relative to outer rings 16A and 16B. The force also tends to displace inner spacer ring 28 relative to T-spacer 22. If the force is along shaft 30, inner spacer ring 28 will move an amount equal to clearance 38A or 38B. If the force is applied radially in relation to shaft 30, inner spacer ring 28 will move an amount equal to clearance 38C. Then the walls of groove 36 in inner spacer ring 28 will contact tongue 34 of T-spacer 22. Thereafter, no further motion of inner spacer ring 28 relative to T-spacer 22 will be possible. Accordingly, no further motion of inner rings 18A or 18B relative to outer rings 16A and 16B is possible.

As described above, a ball bearing assembly will not fail if motion of the inner ring relative to the outer ring is limited to keep contact stresses below the elastic limit of the components of the assembly. Ball bearing failures only occur if inner rings 18A and 18B move more than a predetermined amount, causing the contact stresses to exceed the elastic limit. That predetermined amount depends on many factors such as the size of the balls $20_{1A}, 20_{2A} \ldots 20_{NA}, 20_{1B}, 20_{2B} \ldots 20_{NB}$, the depth of grooves 17A, 17B, 19A, and 19B and the tolerance with which balls $20_{1A}, 20_{2A} \ldots 20_{NA}, 20_{1B}, 20_{2B} \ldots 20_{NA}$ fit into grooves 17A, 17B, 19A, and 19B. Regardless of the exact dimensions of the predetermined amount inner rings 18A and 18B can move relative to outer rings 16A and 16B, clearances 38A, 38B, and 38C must be less than this amount. For precision ball bearing assemblies where the predetermined amount is very small, precision manufacturing techniques will also have to be employed to fabricate T-spacer 22, L-spacer 24, and rectangular spacer 26.

With the invention, when a large radial or axial forces are applied to shaft 30, spacer assembly 14 prevents damage to ring assemblies 12A and 12B. While these large forces are applied, bearing assembly 10 does not spin freely. However, once the large forces are removed, bearing assembly 10 operates normally.

Having described one embodiment of the invention, it will be apparent to one of skill in the art that numerous alternative embodiments could be constructed. Here, inner spacer ring 28 is shown made of two separate pieces to facilitate assembly. Inner spacer ring 28 could be constructed from a different number of pieces. The outer spacer ring could also be constructed from several pieces having, in the aggregate, the shape of T-spacer 22.

Also, two ring assemblies 12A and 12B are shown here. It will be appreciated that if inner spacer ring 28 is firmly secured to shaft 30 and the outer spacer ring made up of T-spacer 22 is firmly secured to base 32, the benefits of the invention can be obtained with only one ring assembly adjacent spacer assembly 14. Of course, other ring assemblies might be required on shaft 30 to balance shaft 30.

Here, inner and outer spacer rings are secured by retaining rings. Other methods of securing a spacer 14 could be used.

Also, the inner spacer ring is shown with a groove and the outer spacer ring is shown with a tongue. The outer ring could be formed with the groove and the inner ring could be formed with the tongue. Moreover, while a tongue and groove arrangement is shown here, other shapes could be used. In essence, any arrangement which allows a portion of the outer spacer ring to interlock with a portion of the inner spacer ring could be used.

This invention is shown with preloaded ball bearings of the type known in the art. However, non-preloaded ball bearings could be used if the application does not require the precision of preloaded bearings.

It is felt, therefore, that this invention should be limited only by the spirit and scope of the appended claims.

What is claimed is:

1. A ball bearing assembly comprising:
    (a) a ring assembly having:
        (i) an inner ring;
        (ii) an outer ring; and
        (iii) a plurality of balls between the inner ring and the outer ring; and
    (b) a spacer assembly having:
        (i) a first spacer ring having a groove therein, said first spacer contiguous with a first of the rings of the ring assembly; and
        (ii) a second spacer ring having a tongue disposed in the groove, said second spacer ring contiguous with a second of the rings of the ring assembly.

2. The ball bearing assembly of claim 1 wherein the first spacer ring comprises a plurality of elements.

3. The ball bearing assembly of claim 2 wherein the plurality of elements comprises:
    (a) a first ring having a substantially rectangular cross section, one portion of said first ring providing one wall of the groove; and (b) a second ring having a substantially L-shaped cross section, portions of said second ring providing one wall and a base portion of the groove.

4. The ball bearing assembly of claim 3 wherein the second spacer ring consists of a single piece.

5. The ball bearing assembly of claim 1 additionally comprising a second ring assembly having:
a) an inner ring contiguous with the inner spacer ring; and
b) an outer ring contiguous with the outer spacer ring.

6. The ball bearing assembly of claim 5 wherein the second ring assembly additionally comprises a plurality of balls between the inner ring and the outer ring.

7. The ball bearing assembly of claim 1 wherein:
(a) the ring assembly is of the type allowing a predetermined displacement of the inner ring relative to the outer ring; and
(b) the tongue being disposed in the groove with a tolerance of less than the predetermined displacement.

8. A ball bearing assembly comprising:
(a) a ring assembly having:
 (i) an inner ring;
 (ii) an outer ring; and
 (iii) a plurality of balls between the inner ring and the outer ring; and
(b) a spacer assembly having:
 (i) a first spacer ring having a groove therein, said first spacer contacting a first of the rings of the ring assembly; and
 (ii) a second spacer ring having a tongue disposed in the groove, said second spacer ring contacting a second of the rings of the ring assembly.

9. The ball bearing assembly of claim 8 wherein the first spacer ring comprises a plurality of elements.

10. The ball bearing assembly of claim 9 wherein the plurality of elements comprise:
(a) a first ring having a substantially rectangular cross section, one portion of said first ring providing one wall of the groove; and
(b) a second ring having a substantially L-shaped cross section, portions of said second ring providing one wall and a base portion of the groove.

11. The ball bearing assembly of claim 10 wherein the second spacer ring consists of a single piece.

12. The ball bearing assembly of claim 8 additionally comprising a second ring assembly having:
a) an inner ring contacting to the inner spacer ring; and
b) an outer ring contacting to the outer spacer ring.

13. The ball bearing assembly of claim 12 wherein the second ring assembly additionally comprises a plurality of balls between the inner ring and the outer ring.

14. The ball bearing assembly of claim 8 wherein:
(a) the ring assembly is of the type allowing a predetermined displacement of the inner ring relative to the outer ring; and
(b) the tongue being disposed in the groove with a tolerance of less than the predetermined displacement.

15. A ball bearing assembly of the type adapted for mounting to a base and for having a shaft mounted through the assembly comprising:
(a) an inner ring adapted for having the shaft mounted therethrough;
(b) an outer ring adapted for being mounted to the base; and
(c) means, disposed adjacent the inner and outer ring, for preventing motion of the inner ring relative to the outer ring in a direction along the shaft when subjected to excessive forces comprising:
 (i) an inner spacer ring having a groove therein, said inner space ring adapted for being mounted around the shaft; and
 (ii) an outer spacer ring having a tongue disposed in the groove.

16. A military projectile of the type having a seeker head mounted to a shaft, said shaft mounted on the bearing assembly of claim 15.

17. The ball bearing assembly of claim 15 wherein the inner spacer ring comprises a plurality of rings, each adapted for mounting around the shaft.

18. The ball bearing assembly of claim 17 additionally comprising:
a) a second inner ring adapted for mounting to the shaft;
b) a second outer ring adapted for mounting to the base; and
c) a plurality of balls disposed between the second inner ring and the second outer ring.

* * * * *